United States Patent [19]

Takeyama et al.

[11] Patent Number: 4,912,383
[45] Date of Patent: Mar. 27, 1990

[54] METHOD OF CONTROLLING A ROBOT

[75] Inventors: Kosei Takeyama; Toshinori Nakamoto, both of Zama, Japan

[73] Assignee: Toshiba Kikai Kabushiki Kaisha, Tokyo, Japan

[21] Appl. No.: 933,043

[22] Filed: Nov. 20, 1986

[30] Foreign Application Priority Data

Nov. 22, 1985 [JP] Japan .................................. 60-263226

[51] Int. Cl.$^4$ ............................................... G05B 19/10
[52] U.S. Cl. ........................... 318/568.11; 318/568.24; 318/567; 364/513
[58] Field of Search ............... 318/568, 568 A, 568 L, 318/568 M, 567, 568.1, 568.11, 568.12, 568.13, 568.14, 568.18, 568.22, 568.24, 569–570; 364/513, 155; 901/4, 5, 43

[56] References Cited

U.S. PATENT DOCUMENTS

| | | | |
|---|---|---|---|
| 3,496,805 | 2/1970 | Ulrichsen et al. | 77/1 |
| 3,889,105 | 6/1975 | Schneekloth | 235/151.11 |
| 4,287,459 | 9/1981 | Dahlstrom | 318/568 A |
| 4,550,383 | 10/1985 | Sugimoto | 318/568 M |
| 4,571,670 | 2/1986 | Kishi et al. | 318/568 X |
| 4,594,670 | 6/1986 | Itoh | 318/568 X |
| 4,621,333 | 11/1986 | Watanabe | 364/513 |
| 4,642,754 | 2/1987 | Kishi et al. | 318/568 X |

FOREIGN PATENT DOCUMENTS

| | | |
|---|---|---|
| 0148425 | 7/1985 | European Pat. Off. . |
| 1549627 | 3/1970 | France . |
| 2147121A | 5/1985 | United Kingdom . |

Primary Examiner—William M. Shoop, Jr.
Assistant Examiner—David S. Martin
Attorney, Agent, or Firm—Banner, Birch, McKie & Beckett

[57] ABSTRACT

A moving component of a robot, such as a robot arm, is controlled to return from a given position to an original point after the moving component has traced paths established respectively by a group of successive motion data blocks including positional data representative of positions of the moving component. The moving component is moved on the basis of positional data in one of the motion data blocks which precedes a present position of the moving component, and then is moved on the basis of positional data in one of the motion data blocks which precedes said first-mentioned one of the motion data blocks. Therefore, the moving component is moved successively backwards along the paths based on the positional data in the motion data blocks.

2 Claims, 3 Drawing Sheets

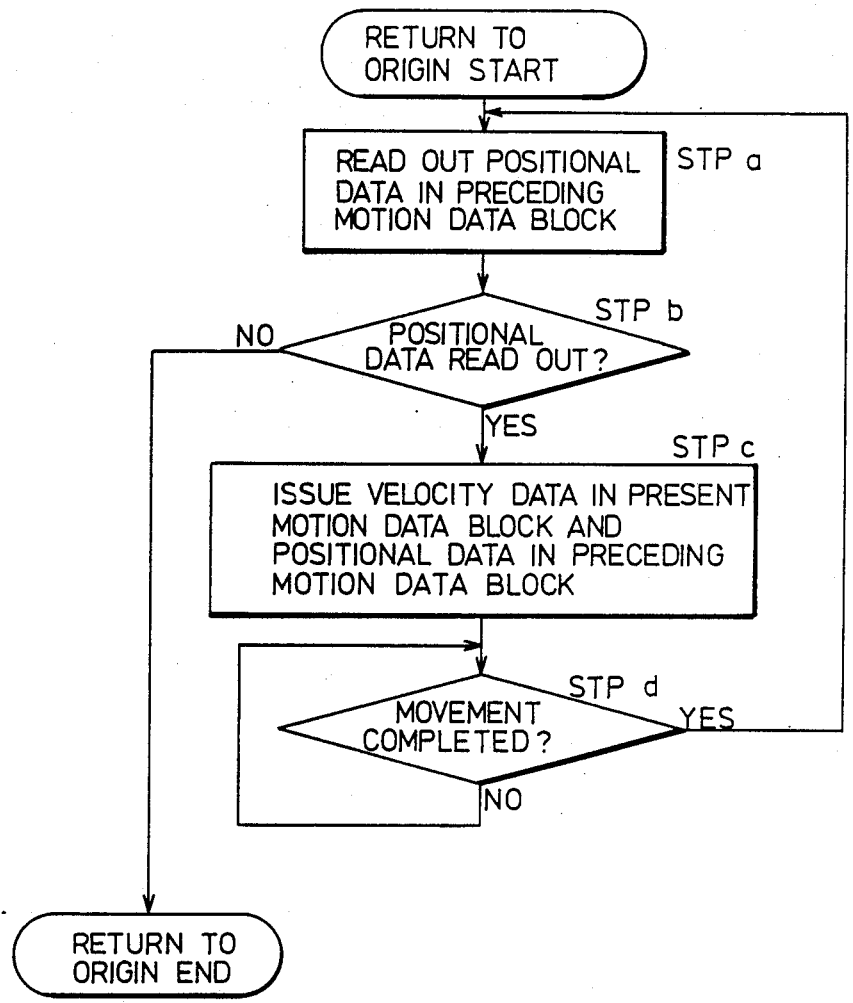

METHOD OF CONTROLLING A ROBOT

BACKGROUND OF THE INVENTION

The present invention relates to a method of controlling a robot, and more particularly to a method of controlling a playback robot of the type in which major points or positions in space are instructed or recorded to establish a path that the robot should trace, the method being capable of moving the robot back to the original point or position along a predetermined path.

Playback robots which are generally used as robots for repeating certain operations operate on the information which they have previously been taught. According to one method of instructing such a playback robot, items of information such as positions in space and speeds of travel are successively stored in a computer, and when a command is given to start the operation, the stored items of information are successively read out from the computer to enable the robot to carry out the operation based on the stored information. Controlling such a playback robot will be described by way of example with reference to FIGS. 1 and 2 of the accompanying drawings.

For moving a moving component or an end effector of a robot, such as an arm, from a position A to a position D while avoiding an obstacle 2 as shown in FIG. 1, the moving component may be instructed to move from the position A to a position B, to a position C and then to the position D without hitting the obstacle 2. For such robot control, a control mechanism for controlling the movement of the moving component is required to store at least positional data representing the positions A through D as target points. More specifically, when teaching the robot, a teaching device such as a teaching box or teaching pendant is operated by a human operator to establish motion data for each step of travel of the moving component. The motion data thus established is schematically illustrated in FIG. 2. Data for instructing a position or a movement step for the moving component is referred to as a motion data block, which will be employed in the following description. The moving component starts moving from the position A, and hence the position A is essentially equivalent to an original point.

Positional data $P_A$ for positioning the moving component in the original point A constitutes a motion data block 1. A motion data block 2 for moving the moving component from the original point A to the position B includes positional data $P_B$ for indicating a target point and velocity data $V_B$ for indicating a velocity at which the moving component is to travel from the original point A to the position B. A motion data block 3 for moving the moving component from the position B to the position C includes positional data $P_C$ for indicating a target point and velocity data $V_C$ for indicating a velocity at which the moving component is to travel from the position B to the position C. Similarly, a motion data block 4 includes positional data $P_D$ corresponding to the position D and velocity data $V_D$ for indicating a velocity for movement from the position C to the position D. Therefore, the moving component of the robot is displaced according to the group of the successive motion data blocks 1 through 4. Paths of travel between the positions A through D are automatically determined by calculations using predetermined interpolation formulas.

Each of the motion data blocks is executed to ascertain whether the data contents thus taught are appropriate or not. If an error is found, the motion data block including the error is corrected. For example, when changing the path from the original point A to the position D after the moving component has been moved to the position D, the moving component is moved back to the original point A and new motion data blocks are established. With a command to return the moving component from the position D to the original point A, the moving component would generally move along a straight line from the position D to the original point A as indicated by the dotted line in FIG. 1, resulting in a collision between the moving component and the obstacle 2. In reality, therefore, it is necessary to first move the moving component to a position E from which it could reach the origin A along a straight line without hitting the obstacle 2, and then to command the moving component to return to the original point A. To move the moving component from the position D to the position E, the robot must be driven sequentially through manual operation of a human operator.

However, where an obstacle of a complex shape or a plurality of obstacles are located closely to the robot, it is difficult to control the robot manually. It is highly complex to manually operate the robot which has a plurality of degrees of freedom. Unless such manual operation were properly carried out, the robot would be highly likely to collide with the obstacle. Therefore, the operator is required to strain to manually operate the robot and has to be highly skilled in the manual operation of the robot.

SUMMARY OF THE INVENTION

It is a major object of the present invention to provide a method of controlling a robot which is operable based on motion data blocks to return automatically to an original point by moving back along an established path without an accident such as a collision with an obstacle.

Another object of the present invention is to provide a method of controlling a moving component of a robot to return from a given position to an original point after the moving component has traced paths established respectively by a group of successive motion data blocks including positional data representative of positions of the moving component, the method comprising the steps of: moving the moving component along the paths toward the original point based on positional data in one of the motion data block which immediately precedes a present position of the moving component; at a velocity based on the velocity data in the motion data block corresponding to the present position whereby the moving component arrives at the original point based on the positional and velocity data in the motion data blocks.

Still another object of the present invention is to provide a method of the type described above, in which each of the motion data blocks corresponding to the positions of the moving component except for the original point includes velocity data for indicating a velocity at which the moving component is to travel up to the position indicated by the positional data in said each motion data block, and in which the velocity at which the moving component moves based on the positional data in the motion data block which precedes the motion data block corresponding to the present position is based on the velocity data in the motion data block corresponding to the present position.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a flowchart of a subroutine for carrying out a robot control method according to the present invention.

DESCRIPTION OF THE PREFERRED EMBODIMENT

FIG. 3 shows a subroutine which is programmed in a computer for carrying out a method of the present invention.

For starting the returning to an original point of a moving component of a robot which has been moved to a desired position based on a group of motion data blocks, a command is issued in a step a to read out the positional data in a motion data block preceding the finally executed motion data block, i.e., the motion data block corresponding to the present position of the moving component. Then, a step b ascertains whether the positional data has been read in the step a or not. If the positional data has been read, then the velocity data in the motion data block corresponding to the present position of the moving component and the positional data in the preceding motion data block are issued in a step c Thereafter, a step d ascertains whether the movement of the moving component based on the velocity data and the positional data that have been issued in the step c has been completed or not. If the movement of the moving component has been completed, then the processing returns to the step a and executes the above steps. If not completed, then the step d is repeated until the movement of the moving component is completed. If no positional data has been read out in the step b, then the entire process of returning the moving component to the original point is finished.

The robot control method according to the present invention is essentially effected according to the above procedure. A process of returning a moving component of a robot from the motion data block 4 (FIG. 2) to the original point according to the robot control method of the invention, using the motion data blocks of FIG. 2, will be described below.

Figure 1:
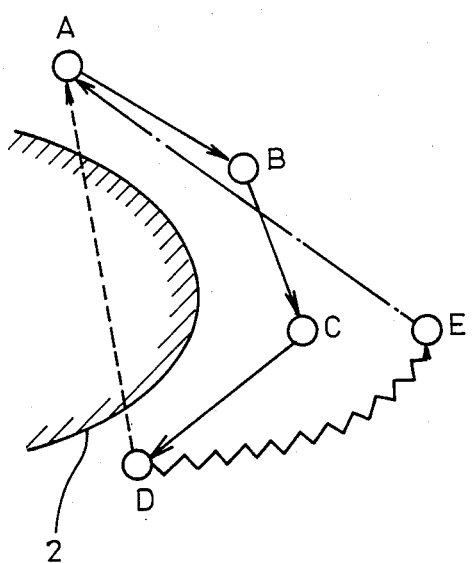
FIG. 1 is a schematic view showing, by way of example, paths traced by a moving component of a robot.
Figure 2:
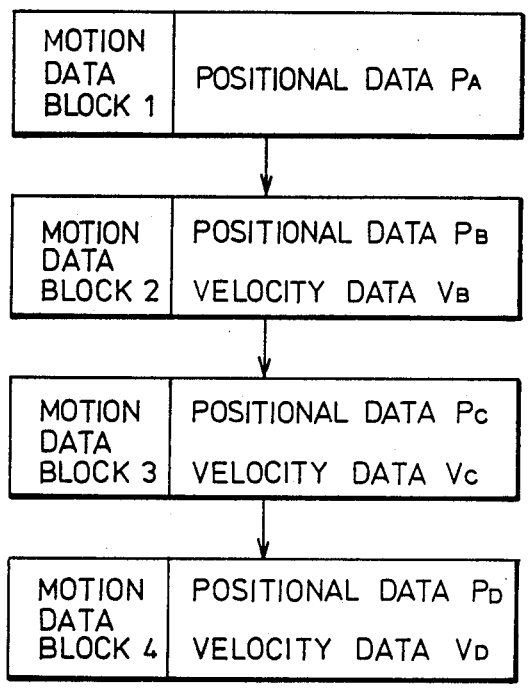
FIG. 2 is a diagram of a group of motion data blocks for moving the moving component along one of the paths shown in FIG. 1.

For returning the moving component to the original point A after the moving component has been moved to the position D based on the motion data blocks shown in FIG. 2, the step a is executed first, i.e., a command is issued to read out the positional data in the preceding motion data block which is the motion data block 3. Then, the step b determines whether the positional data has been read out or not as a result of the execution of the step a. Since the positional data $P_C$ has been read out in the step a, the step b is followed by the step c which issues the velocity data $V_D$ in the motion data block 4 and the positional data $P_C$ in the motion data block 3. As a result, the moving component is moved from the position D to the position C based on the velocity data $V_D$. When the movement is completed, then the processing goes from the step d back to the step a. The step a then reads out the positional data $P_B$ in the motion data block 2. The processing goes from the step a via the step b to the step c which issues the velocity data $V_C$ in the motion data block 3 and the positional data $P_B$ in the motion data block 2. The moving component is now moved from the position C to the position B based on the velocity data $V_C$. If the step d determines that the movement has been completed, then the step a is executed again. The positional data $P_A$ in the motion data block a is read out in the step a, which is followed successively by the steps b and c. The step c issues the velocity data $V_B$ in the motion data block 2 and the positional data $P_A$ in the motion data block 1. The moving component now returns from the position B to the original point A based on the velocity data $V_B$. The step d is then followed by the successive steps a and b. Since no motion data block is present before the motion data block 1, the result of the decision in the step b is NO, and the processing of returning to the original point is finished.

Inasmuch as the moving component of the robot moves from the position D to the position C to the position B to the position A, the moving component is prevented from colliding with the obstacle 2. No complex manual operation of the robot is required because the processing of returning to the original point can automatically be effected simply by executing the program based on the flowchart of FIG. 3.

While in the illustrated embodiment the velocities at which the moving component returns to the origin are successively established by issuing the velocity data corresponding to the respective movement zones, it is possible to uniformize the velocities in the respective movement zones during returning movement to the origin.

With the arrangement of the present invention, for moving back to an original point a moving component of a robot which is moved according to a group of motion data blocks, individual positional data in the motion data blocks are successively read out in reverse. Therefore, the moving component is moved back to the original point by tracing back the preset path, without hitting any obstacle. The robot control method of the present invention is also quite simple, not requiring the conventional manual complex operation, since the method can automatically be effected by a simple program subroutine.

Although a certain preferred embodiment has been shown and described, it should be understood that many changes and modifications may be made therein without departing from the scope of the appended claims.

What is claimed is:

1. A method of controlling the moving component of a robot to return from a given position to an original point after the moving component has traced paths established respectively by a group of successive motion data blocks, each said motion data block including positional data representative of positions of the moving component, each said motion data block except for the motion data block corresponding to the original point further including velocity data for indicating a velocity at which said moving component is to travel up to the position indicated by the positional data in each said motion data block, said method comprising the steps of: sequentially moving said moving component along said paths toward said original point based on positional data in the motion data block which immediately precedes a present position of said moving component at a velocity based on the velocity data in the motion data block corresponding to the present position, whereby the moving component arrives at said original point based on the positional and velocity data in said motion data blocks.

2. A method according to claim 1, wherein the velocities at which the robot returns to the original point are uniform in respective movement zones

* * * * *